Sept. 14, 1965 W. G. PRINTZ ETAL 3,206,134
WEB WINDING APPARATUS
Filed Dec. 5, 1963 7 Sheets-Sheet 1

INVENTORS,
WARREN G. PRINTZ
DIMITRIJS RUBENIS
WILLIAM LITHGO
BY KARL W. FLOCKS
ATTORNEY

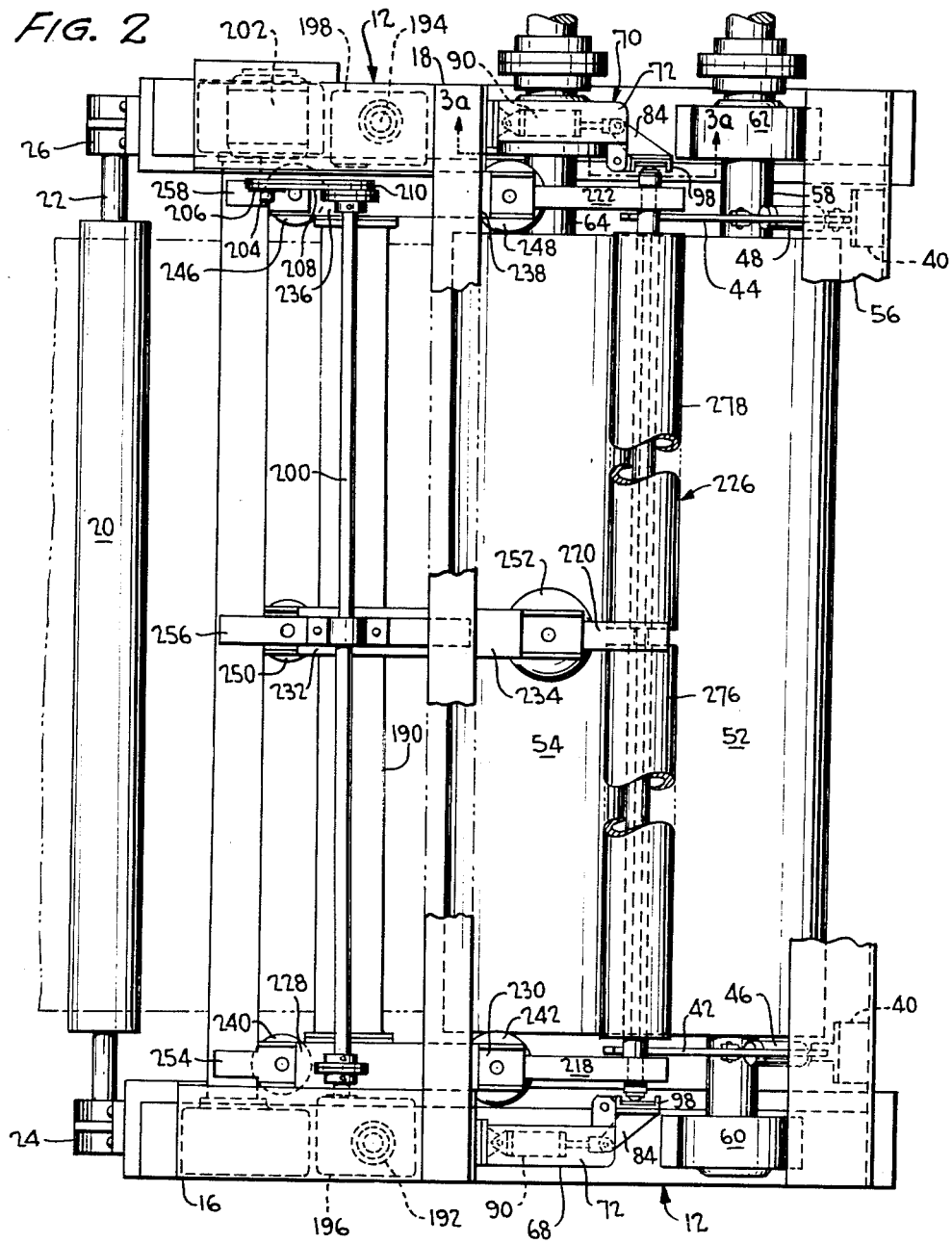

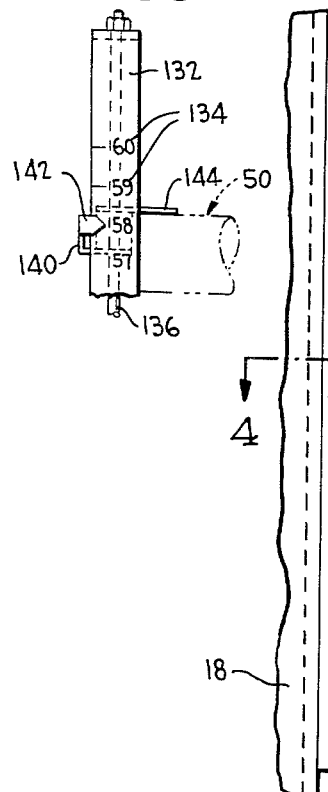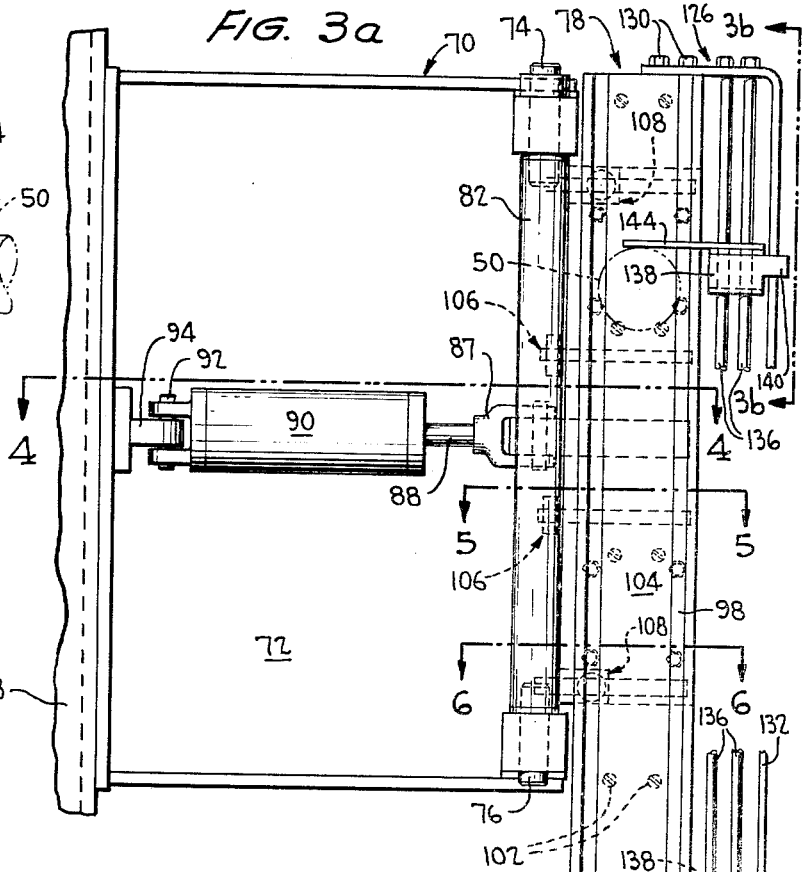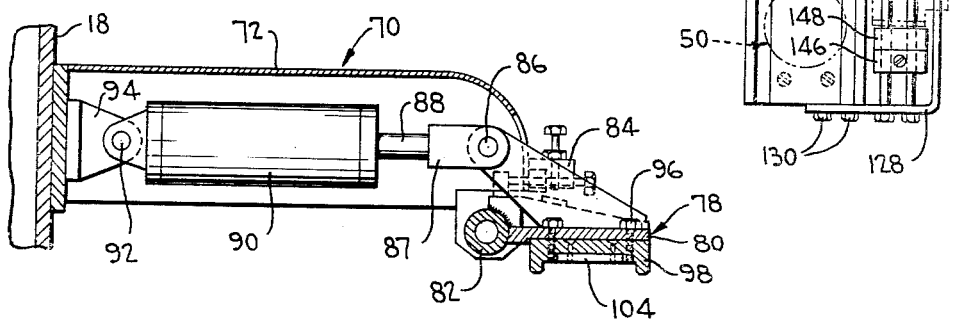

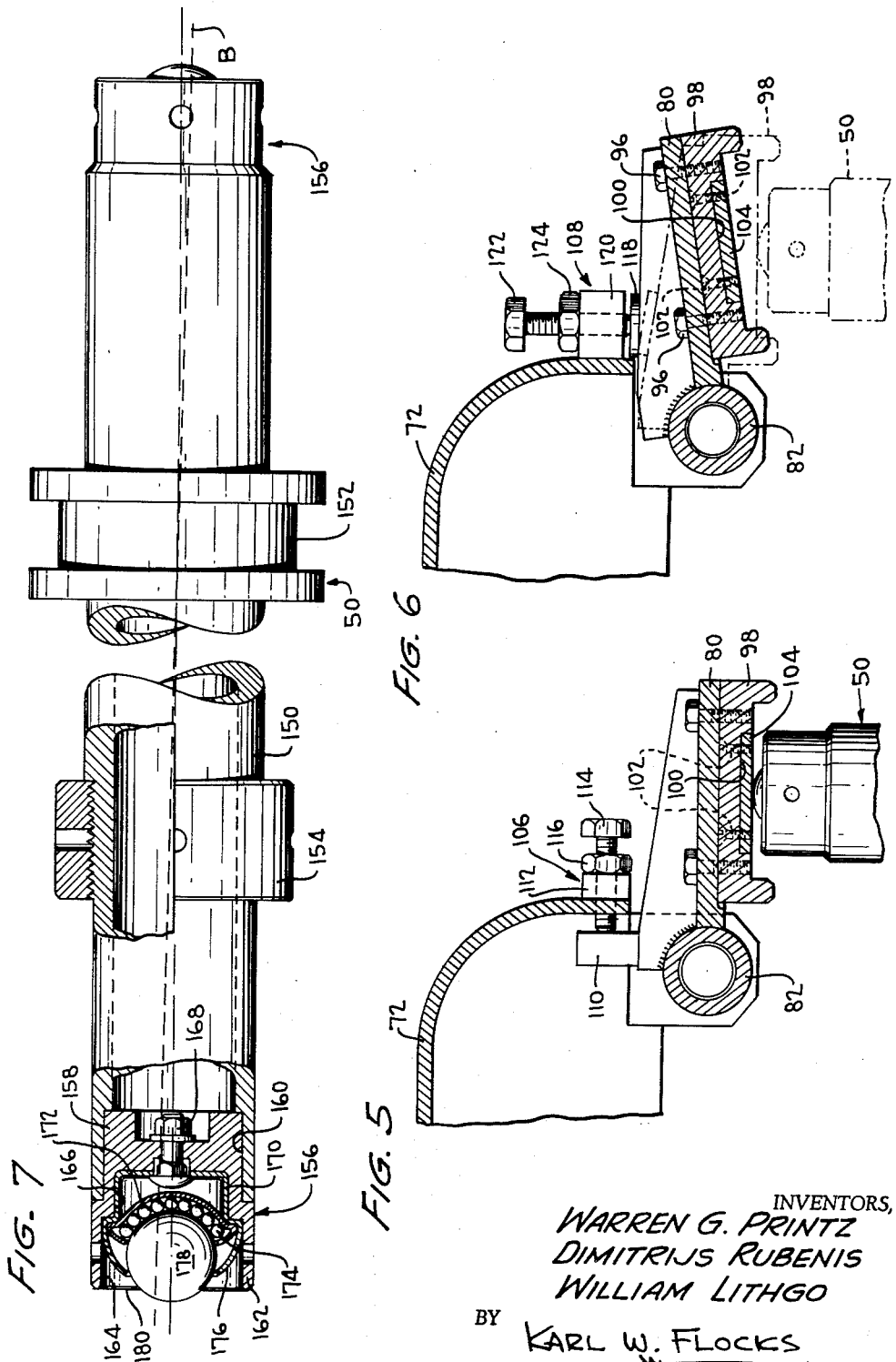

Sept. 14, 1965     W. G. PRINTZ ETAL     3,206,134
WEB WINDING APPARATUS
Filed Dec. 5, 1963     7 Sheets-Sheet 5
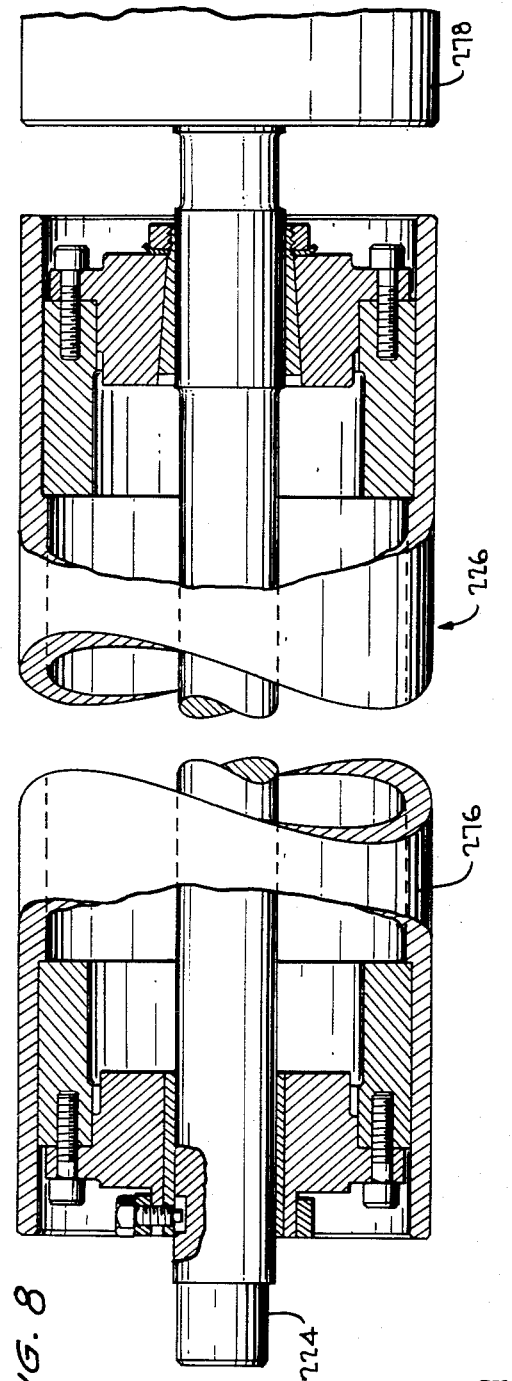
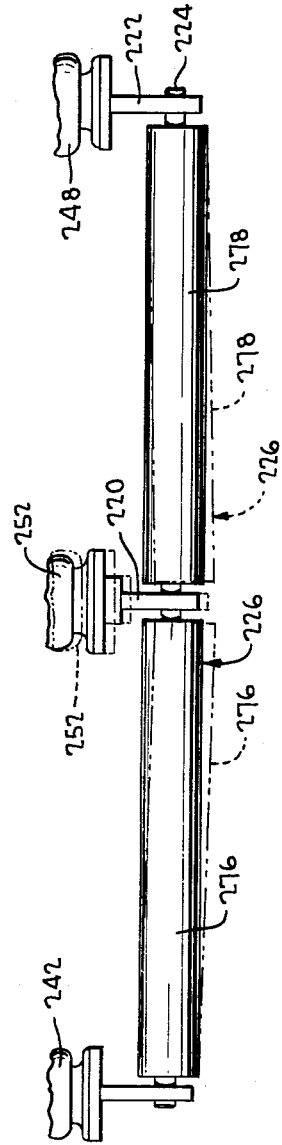
INVENTORS,
WARREN G. PRINTZ
DIMITRIJS RUBENIS
WILLIAM LITHGO
BY KARL W. FLOCKS
ATTORNEY Sept. 14, 1965

W. G. PRINTZ ETAL 3,206,134

WEB WINDING APPARATUS

Filed Dec. 5, 1963

INVENTORS
WARREN G. PRINTZ
DIMITRIJS RUBENIS
WILLIAM LITHGO

BY KARL W. FLOCKS

ATTORNEY

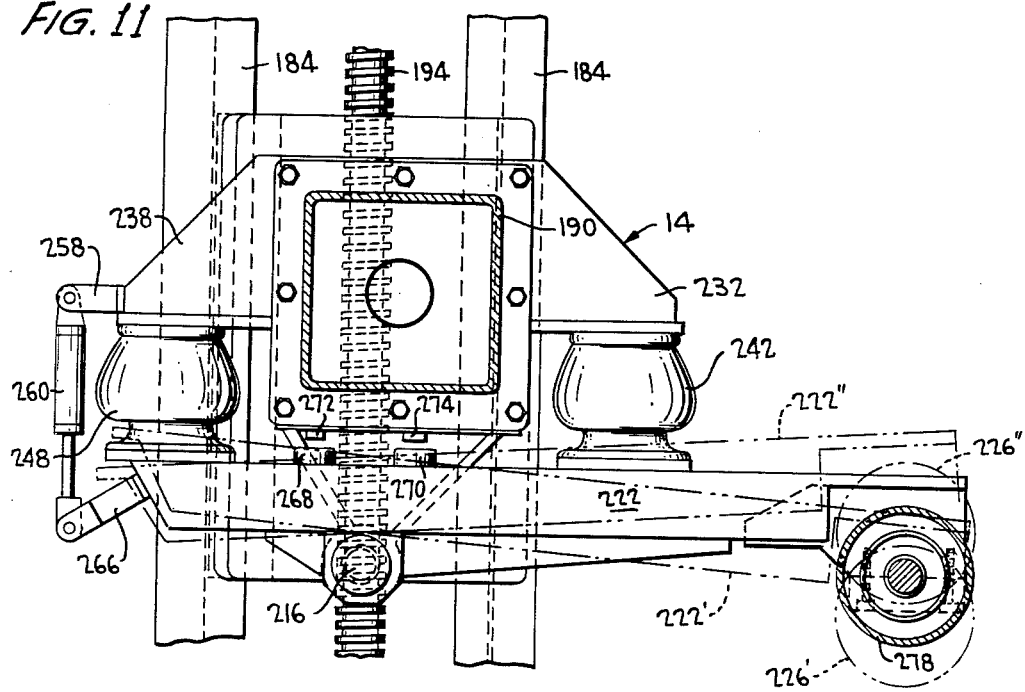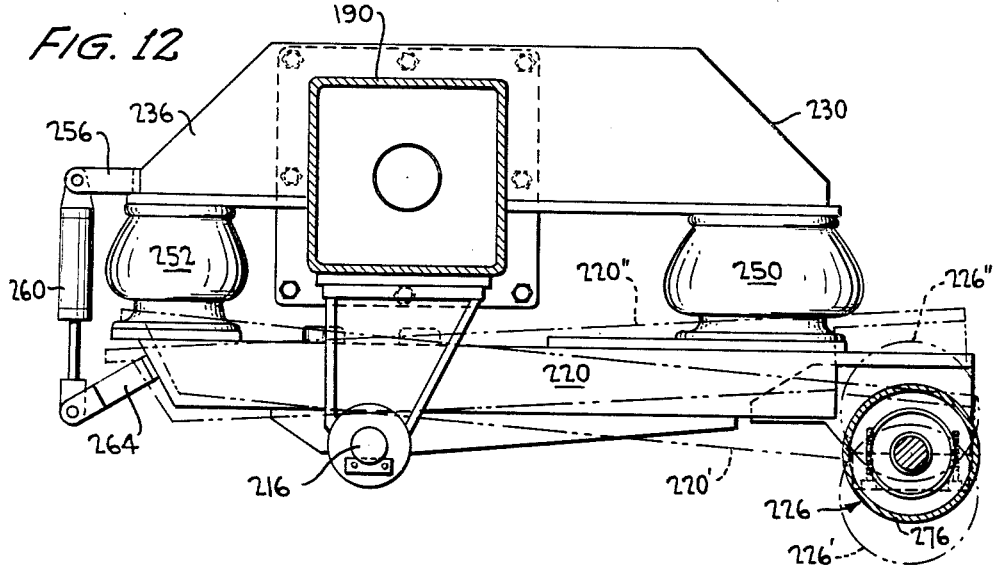

United States Patent Office 3,206,134
Patented Sept. 14, 1965

3,206,134
WEB WINDING APPARATUS
Warren G. Printz, Middletown, Dimitrijs Rubenis, Monroe, and William Lithgo, Middletown, Ohio, assignors to Diamond International Corporation, a corporation of Delaware
Filed Dec. 5, 1963, Ser. No. 328,290
4 Claims. (Cl. 242—66)

This invention relates generally to web winding equipment, and more particularly to web winding apparatus.

The winding apparatus of this invention is of a relatively huge and massive character wherein the rolls thereof may be as much as 84 inches in diameter and up to 15 feet or more in length.

Many conventional machines of the character involved are extremely complicated; include mechanical parts which cause frictional resistance to winding; fail to compensate for core shaft distortions; fail to adequately control initially and subsequently applied nip pressures during winding resulting in internal pressures which may cause a roll to burst; fail to compensate for "soft spots" and varying caliper thicknesses of a web being wound; and generally do not produce the high quality rolls of an even density throughout to meet the critical and stringent demands of the industry.

A primary object of the present invention is to provide novel winding apparatus which generally compensates for the many variable factors which might adversely affect the production of acceptable rolls of web material.

A further object of the present invention is to provide in a frictionally driven core shaft novel core guide ways which compensate for axial distortion of the longitudinal axis of the core.

A further object of the present invention is to provide novel means for positively controlling the applied nip pressure incrementally along the longitudinal axis of rider roll whereby the winding pressure in a roll being wound can positively be controlled from the moment winding is initiated until winding is completed.

A still further object of the present invention is to provide novel counterbalance means for the static load of a rider roll carriage assembly.

Still further, the present invention provides novel winding apparatus compensating for any one and/or the combination of the following:

(a) unequal web thicknesses across the width of the web which cause unequal increases in diameter over the width of the roll by incrementally controlling the applied nip pressure along different sections of a rider roll;

(b) providing free or independently journaled rotating sections on a rider roll which adjust their rotational speed and cooperate to maintain the desired contact pressure controlling the density of a roll being produced through the entire winding cycle;

(c) controlling the contact pressure applied through different sections of a winder roll to permit an operator to increase or decrease the density of any part of a roll being produced and thereby avoid wide variations in roll density and avoiding internal pressures which might eventually cause rolls to split open;

(d) afford a flexibility in multiple position, variable loading of a rider roll to compensate for web thickness variation across the width;

(e) compensate for increasing size and weight of a roll during a winding cycle by varying the contact pressure between the winding rolls frictionally driving a roll during a winding cycle;

(f) controlling the very initial stages of a wind-up cycle by exerting the correct amount of pressure across the entire width of a new roll and immediately correcting for the tendency of soft spots to occur, and concurrently varying the applied pressure to compensate for the changing angle of contact between the driving drums and the roll being wound due to the increasing weight of the roll being produced;

(g) towards the end of a winding cycle, and during the increasing weight of a wind-up roll gradually and concurrently relieving applied nip pressure afforded by a rider roll;

(h) particularly at the end of a winding cycle, substantially removing all of the pressure applied by a rider roll and yet permitting the winding roll to maintain contact of the roll being produced in order to afford automatic production of a roll;

(i) affording means to compensate for different conditions occuring due to winding different grades of web material wherever certain materials require relief of application of nip pressure at the extreme ends of a roll being produced while maintaining a relatively slight contact pressure at the center of the roll being produced as well as affording means for compensating for similar variations of these certain required conditions;

(j) incorporating means to effectively and automatically compensate for the static weight of a rider roll carriage assembly by providing pressure loaded diaphragms in conjunction with a linkage and oscillation dampening means to afford a degree of control heretofore not contemplated by the prior art.

Other and more specific objects of the invention will be apparent to those skilled in the art from a consideration of the following description when taken in conjunction with the accompanying drawings forming a part thereof, illustrating a preferred embodiment of winding apparatus according to this invention.

FIG. 2 is a top plan view of FIG. 1 with portions of the frame being removed;

FIG. 3a is an enlarged fragmentary side elevation taken substantially on the plane of line 3a—3a of FIG. 2, showing details of one of the roll-core guide ways, and showing by phantom lines alternate position of the roll-core;

FIG. 3b is a fragmentary front elevation looking substantially from the plane of line 3b—3b of FIG. 3a, and showing details of a roll-diameter gauge;

FIG. 4 is a fragmentary horizontal section taken substantially on the plane of line 4—4 of FIG. 3a and showing details of the roll-core guide ways;

FIG. 5 is an enlarged fragmentary section taken substantially on the plane 5—5 of FIG. 3a showing details of a roll-core guide way stop for positioning the guide way in relation to the terminal end of a roll core;

FIG. 6 is a fragmentary section taken substantially on the plane of line 6—6 of FIG. 3a showing details of another adjustable stop for the guide way for determining the position thereof when the roll-core is being inserted or removed from the apparatus;

FIG. 7 is a view of an enlarged plan view of a roll core shaft with an intermediate portion thereof being broken away, and portions being shown in section for purposes of showing details of construction;

FIG. 8 is an enlarged fragmentary plan view of a rider roll per se showing details of construction and the independently journaled sections of the rider roll;

FIG. 9 is a fragmentary elevational view, looking substantially from the plane of line 10—10 of FIG. 1 indicating diagrammatically the manner in which nip pressures of a rider roll may be controlled incrementally along the length thereof;

FIG. 11 is a vertical section taken substantially on the plane of line 11—11 of FIG. 10 showing details of the rider roll and carriage assembly, and showing by means of phantom lines an alternate position thereof; and FIG. 12 is a vertical section, similar to FIG. 11, and taken on the plane of line 12—12 of FIG. 10.

Figure 1:
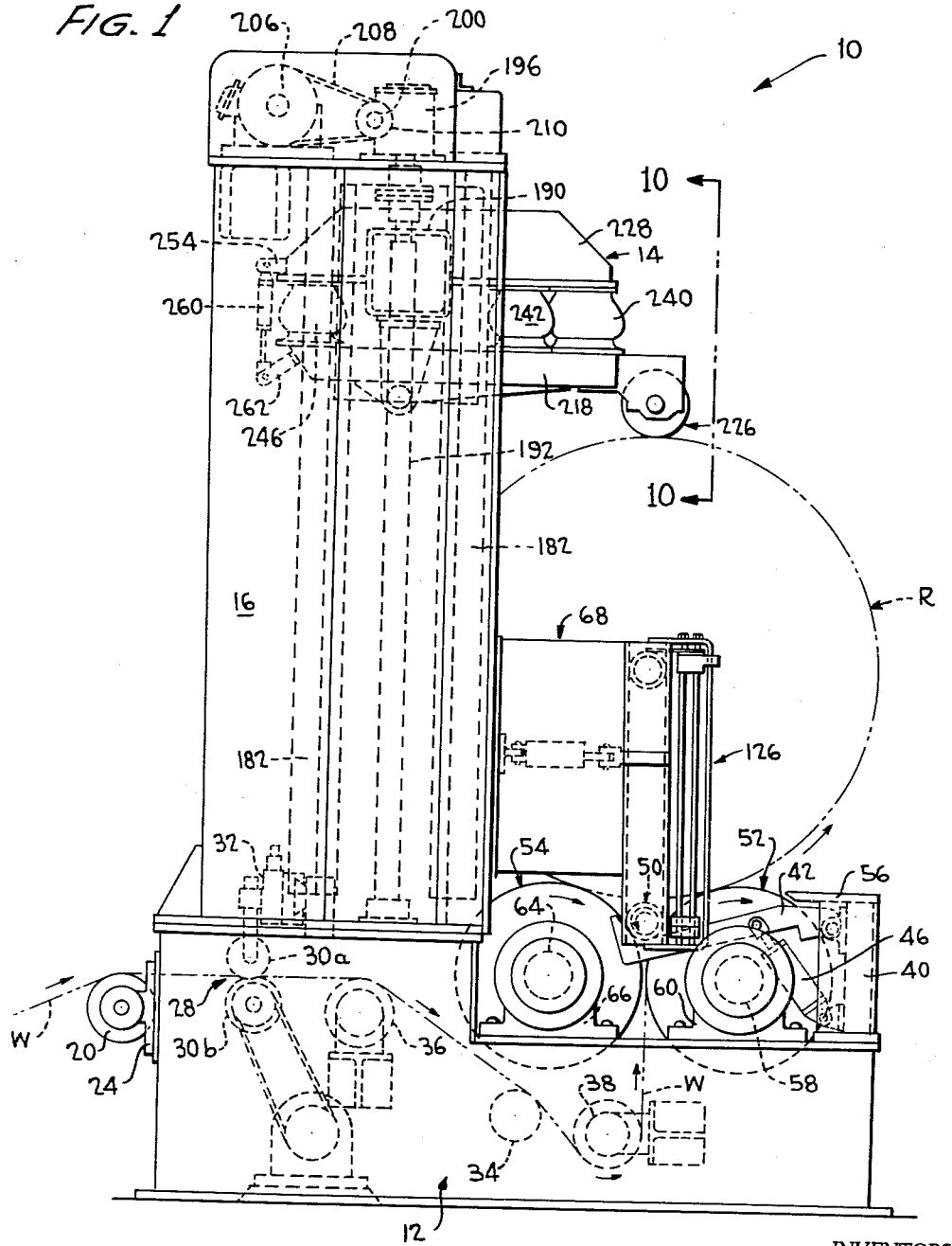
FIG. 1 is a side elevation of winding apparatus according to this invention; showing by means of phantom lines a convoluted roll of web material after the completion of a winding cycle.

Referring to the drawings in detail, and first considering FIGS. 1 and 2, a preferred embodiment of a winder apparatus according to this invention is indicated generally at 10 and comprises a support frame indicated generally at 12 which has mounted thereon for vertical movement a rider-roll carriage assembly indicated generally at 14.

The support frame 12 includes vertically extending side members maintained in rigid relationship by suitable reinforcing members and the like (not shown). Extending transversely between the side frame member 16 and 18 is a web carrier roll 20, the terminal ends of a support shaft 22 thereof being journaled in suitable support bearing brackets 24, 26, respectively, mounted on the side frame member 16 and 18; see FIG. 2.

Suitably mounted at a lower portion of the support frame 12 and indicated generally at 28 is a web slitter assembly which will include a plurality of transversely disposed top slitter wheels 30a and bottom slitter drums 30b (only one each being shown) mounted on a suitable support structure 32. Mounted rearwardly of the slitter assembly 28 and carried on suitable support structure is a web spreader roll 34, and a guide and carrier roll 36 and 38, respectively. Particular details of the slitter assembly and carrier, spreader and guide rolls will not be described in detail as they are covered by separate patent applications, however, it is believed clearly apparent to those skilled in the art that a web will be received on the roll 20, pass through the slitter assembly 28 and continue over the rolls 34 and 36 to pass beneath the roll 38 and will then continue vertically in the manner seen in FIG. 1.

Suitably mounted on a vertical support portion 40 of the frame 12 is a pair of loading arms 42 and 44 which will be controlled by the operation of fluid motors 46 and 48, respectively, which will be utilized to elevate and lower a roll-core 50 into a properly oriented position in the nip formed between winder drums 52 and 54. It will be noted that the arms 42 and 44 are disposed outside of the opposite ends of the drum 52 to accordingly permit the roll-core 50 to be removed from a support platform or plate 56 of the support structure and deposit it between the drums 52 and 54.

The drum 52 includes a support shaft 58 which is journaled in bearings 60 and 62 mounted on upper edge portions of the side frame members 16 and 18, respectively. The drum 54 includes a suitable support shaft 64 which is journaled at opposite ends in support bearings such as that indicated at 66 in FIG. 1 and carried by the side frame members 16 and 18. The drum 52 will generally comprise the speed-controlled power-driven drum and by frictionally engaging the core shaft 50, when rotated in a clockwise direction, will cause the core roll 50 to rotate in a counterclockwise direction to accordingly form a roll R as indicated by phantom lines in FIG. 1. The drum 52 is power driven and speed controlled, the drum 54 is also power driven but only the output torque is controlled, and due to the frictional contact with the roll core 50, applies a turning effort adjustably less than, equal to, or greater than the turning effort supplied to the roll core 50 by the drum 52. Because of frictional engagement of the core roll 50 where it contacts the surface of drum 52 and 54, the surface speed of both drums and of the roll core 50 are essentially equal throughout the entire speed range from zero to maximum. Reversing the direction of the drive motors on the drums 52 and 54 will permit roll R to be rolled or formed in a clockwise direction with essentially the same torque and speed control but with the opposite surface of the web W exposed on the finished roll R.

The side frame members 16 and 18 have extending rearwardly therefrom roll-core guideway assemblies indicated generally at 68 and 70; see FIGS. 3a–6. The roll-core guideway assemblies 68 and 70 are substantially identical and thus only the assembly 70 will be described in detail. The guideway assembly 70 includes a rearwardly extending support member 72 fixed to the side frame member 18 and has pivotally mounted by means of upper and lower pivot pins 74 and 76, respectively, a way member indicated generally at 78. The way member 78 includes a mounting plate 80 integral with an elongated tubular sleeve member 82 journaled at its upper and lower ends on the pins 74 and 76. Intermediately of the mounting plate 80 is an outwardly extending lever portion 84 pivotally connected at 86 to the bifurcated end 87 of a thrust rod 88 of a fluid motor 90. The fluid motor is pivotally connected at 92 to a support bracket 94 mounted on the support member 72.

The mounting plate member 80 has fixedly secured thereto by means of machine screws 96, way elements 98 which incorporate longitudinally thereof a grooved portion 100 receiving therein a suitable bearing insert 104 of tempered steel or the like which is retained therein by means of machine screws 102.

As seen in FIGS. 5 and 6, the way member 78 may be pivoted outwardly, the position shown in FIG. 6, to permit disposition of a roll-core 50 between the nip of the drums 52 and 54. Subsequently, the way members are pivoted to the position shown in FIG. 5 due to the operation of the fluid motors 90 to maintain the roll-core 50 against lateral or longitudinal displacement between the way members. The roll-core 50 may become bent or slightly out of longitudinal alignment due to mishandling, etc., see the dotted line B extending along the longitudinal axis of FIG. 7, for example. When the roll-core 50 is rotated about its longitudinal axis by means of the winding drum 52 and 54, the terminal end of the roll-core will move in a circular or orbital path, i.e., not in exact alignment with the true longitudinal axis of the roll-core. The way elements will not restrict the terminal ends of the roll core and will accordingly permit the orbital path of movement to be followed and in this manner compensates for eccentricities of the roll-core along its longitudinal axis.

Indicated generally at 106 and 108; see FIGS. 3, 5 and 6, are abutment assemblies for respectively orienting the way members to their maximum extent of inward and outward movement as illustrated in FIGS. 5 and 6.

The abutment assembly 106 comprises an outwardly projecting abutment element 110 integral with the mounting plate member 80. Mounted on the support 72 in substantial alignment with the abutment portion 110 is internally threaded mounting portion 112 which receives therein an adjustable screw 114. Circumposed about the threads of the screw 114 is a lock nut 116 for maintaining the terminal end thereof in adjusted relationship with respect to the abutment 110. When the nut 116 is backed off, the maximum extend of inward movement of the way member 98 is determined and subsequently the nut 116 is tightened to maintain the adjusted position of the screw with respect to the abutment. Due to operation of the motor 90, a maximum extent of inward movement in the way members is controlled.

Abutment assemblies 108 function in substantially the same manner as the adjustable abutment assemblies 106. Assemblies 108 include an abutment pad 118 integral with the mounting plate 80 and in opposed relationship to an internally threaded mounting portion 120. The portion 120 receives an adjusting screw 122 terminally engageable with the abutment pad 118 and having circumposed thereabout a lock nut 124. It will be readily apparent from FIG. 6, that the abutment pad and terminal end of the adjusting screw determine the maximum extent of outward movement of the way member 98.

Considering FIGS. 1, 3a and 3b, a control gauge is indicated generally at 126 and comprises a vertically extending, substantially U-shaped frame 128 secured to the upper and lower ends of the mounting plate 80 by means of machine screws 130. The frame member 128 includes a forward plate portion 132 having disposed thereon a suitable scale and indicia portion 134 for indicating the diameter of the roll being produced. Extending vertically and parallel to the plate 132 is a pair of support bars 136 which have reciprocably supported thereon a block element 138. The block element 138 includes a portion 140 projecting along one edge of the plate 132 and including an inwardly extending pointer portion 142; see FIG. 3b, which aligns with the indicia portion 134. The block 138 includes a feeler bar portion 144 engaged on the upper surface of the roller core shaft 50; see FIG. 3b.

Retained in a fixed position on the bars 136 by means of a stop block 146 is an abutment block 148 which may incorporate therein a suitable control switch for controlling a circuit to a motor (not shown) which operates the winding drum 54. When the block 138 is in the phantom line position shown at the lower end of FIG. 3a, the winding drum 54 will be permitted to operate. Although not shown, a suitable stop block may be mounted on an upper portion of the bars or rods 136 at a predetermined position along the gauge or indicia 134; thus when a winding cycle for the roll R is completed, this switch may serve to open the circuit to the motor which is driving the winding drum.

Referring to FIG. 7, a roll-core 50 comprises a tubular shaft 150 including a fixed annular abutment portion 152 adjacent one end and adjustable abutment 154 threadedly mounted adjacent the other end thereof. The abutments 152 and 154 will accommodate therebetween the conventional tubular core element upon which the roll R is wound. Suitably secured at opposite ends of the shaft 150 are anti-friction bearing assemblies indicated generally at 156.

The bearing assemblies 156 comprise an annular shank portion 158 telescoped within the end 160 of the body member 159. The shank 158 is integral with a body portion 162 including a recess 164 opening into the end thereof and communicating with annular undercut recess 166. Secured by means of a suitable nut and bolt assembly 168 is a bearing housing member 170 which has fixedly secured therein a bearing retainer element 172 including therein a nest of ball bearing elements 174. The member 170 includes a retaining collar 176 maintaining therein a large ball bearing 178 seated in the nest of bearings 174 and projecting slightly beyond the terminal end 180 of the terminal end of roll core shaft 150. The roll core shaft 150 will engage the guide way member 98 tangentially, i.e., at a single point and there will be relatively little frictional contact at the terminal end of the core shaft.

As previously mentioned, due to frequent use, mishandling, etc., the roll-core 50 may be slightly bent and the longitudinal axis thereof may be disposed in the position indicated at B. When this occurs and a roll is being formed, the terminal ends of the roll core will have an orbital path with respect to the guide way members 98, however, as previously mentioned, this type of movement will be accommodated for.

The tension on web W being fed into drums 52 and 54 will to a certain extent have an effect on the density of the roll being wound. However, the rider roll has a more marked effect on the density or hardness of the roll R, especially during initial formation stages. The rider roll assembly, as will subsequently be described in detail, has an extremely fast response to compensate for localized soft spots, web thickness or caliper variation.

The rider roll carriage assembly will be progressively elevated during the formation of the roll R and is power driven in response to the increasing diameter of the roll R from the initial diameter of the roll core to that which is ultimately being formed during a winding cycle.

Figure 10:
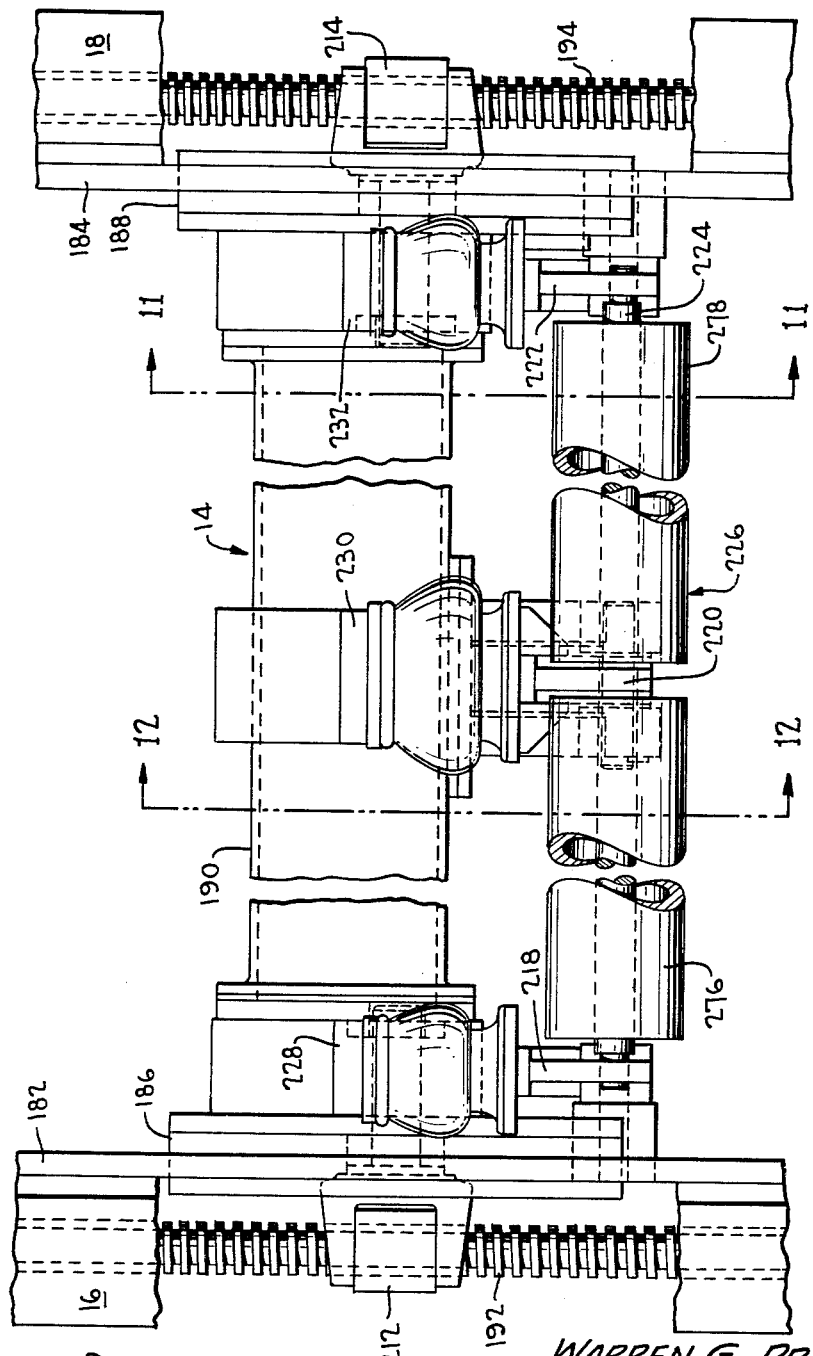
FIG. 10 is an enlarged fragmentary elevational view taken substantially on the plane of line 10—10 of FIG. 1 portions being broken away, and showing details of the rider roll carriage assembly and the elevating screws thereof.

The side frame members 16 and 18 respectively include opposed way members; see FIGS. 1, 10, and 11, which reciprocably receive complementary or corresponding end portions 186 and 188, respectively, of a transversely disposed rider-roll beam 190. Journaled at respective upper and lower ends in the side frame members 16 and 18 are externally threaded elevated shafts 192 and 194, respectively, the upper ends of which being operatively connected in power-transmission units 196 and 198, respectively; see FIG. 2, which will not be described in detail. Operatively connected to the units 196 and 198 is a transversely disposed drive shaft 200 which synchronizes simultaneous rotation of the externally threaded screw shafts 192 and 194. Mounted on side-frame 18 is a suitable motor 202 including a power output shaft 204; see FIG. 2, which has a sheave 206 secured thereon, and over which is entrained a drive belt 208 trained over a sheave 210 secured at the end of the transverse shaft 200.

The rider roll carriage beam 190 includes at opposite ends thereof and extending between the way members 182 and 184, carrier nuts and retainers 212 and 214 respectively engaged on the threaded shafts 192 and 194 as clearly seen in FIG. 10. Accordingly, simultaneous rotation of the shafts 92 and 94 will cause elevation of the rider roll carriage 14.

The cross beam 190 of the rider roll carriage assembly 14 includes a lower, transverse support shaft or shafts 216 on which are pivotally mounted for vertical oscillation in longitudinally spaced relation therealong, intermediately pivoted, cross-beam members 218, 220 and 222; the cross-beam members 218 and 222 and the components cooperating therewith are substantially identical. The rear ends of the cross-beam members 218–222 have fixedly secured thereto the longitudinal shaft 224 of a transverse, sectionalized rider-roll member indicated generally at 226.

The beam 190 has extending forwardly and rearwardly thereof in overlying relationship to cross-beams 218, 220 and 222 abutment beam portions 228, 230 and 232 and 234, 236 and 238. Depending from the abutment beam portions 228 and 232, and 234 and 238 are pneumatic, flexible counterbalancing diaphragms 240 and 242, and 246 and 248, respectively secured to underlying portions of the cross beams 218 and 222. Also depending from forward and rear ends of the abutment portions 230 and 236 are pneumatic counterbalancing diaphragms 250 and 252 which are respectively connected to underlying portions of the cross-beam member 220. The pneumatic pressure which will be directed to the counterbalancing diaphragms 246, 248, and 252 will be provided with a suitable piping system (not shown) controlled at a console remote from the apparatus.

The abutment portions 234, 236 and 238 have projecting rearwardly therefrom support portions 254, 256 and 258, respectively, and these portions have pivotally connected, as seen in FIGS. 11 and 12, shock absorbing assemblies 260 pivotally connected at their lower ends to rearwardly projecting abutment brackets 262, 264 and 266, respectively; see FIGS. 1, 11 and 12.

The loading diaphragms at opposite ends of the cross-beams 218–222 will be independently controlled to permit deflection of the character illustrated diagrammatically in FIG. 9. In this regard, selected areas of the roll R may be subjected to different pressures which is particularly critical during initial formation of the roll R. In this manner, the static weight of the rider roll 226 may be substantially counterbalanced or offset by the independently controlled counterbalancing diaphragms. The amount of pressure to be applied through the independent loading diaphragms may be changed at the remote console at any time during the winding cycle. Manual controls will be provided to operate the motor 202 to lower the rider roll carriage assembly 14 and a predetermined pressure will be applied in the counterbalancing diaphragm in order to obtain a previously determined nip pressure across the entire web which is being rolled. When pressure is applied by means of the counterbalancing diaphragms, the cross-beams 218–222 will be inclined downwardly as indicated at 220', and 222' in FIGS. 11 and 12. When a predetermined nip pressure is obtained, the rider roll carriage assembly 14 will be no longer lowered and the apparatus is in a condition to start a winding cycle.

One of the cross-beams, 222, for example, will include on the upper surface thereof longitudinally spaced switch actuating bumpers 268 and 270; see FIG. 11, which will be effective to engage overlying control switches 272 and 274 which control operation of the drive motor 202 for the elevating shafts 192 and 194. When the rider roll as indicated at 226' is in its downwardly inclined phantom line position, the motor 202 will not operate. However, as the roll R builds up and the diameter thereof increases, the rider roll 226 will move to the upper position 226" and the cross-beams 218–222 will be in an upwardly inclined position as indicated at 220" and 222". When this occurs, the bumper 270 will engage the control switch 274 to activate the motor 202 resulting in the rider roll carriage 14 being elevated to the previously described downward position indicated at 226'. This function proceeds automatically through the entire winding cycle, and the shock absorbers or dampeners 260 prevent excessive oscillation which might result from any slight out-of-roundness of the roll R.

Referring to FIG. 8, the rider roll 226 includes at least two independently journaled rider roll sections 276 and 278. The two separate sections are independently journaled and intimate details of the mounting will not be described in detail. However, it is believed readily apparent that selected pressures may be varied across the entire length of the rider roll 226 for purposes of selecting those areas where the nip pressure on the roll R should be varied.

Through the utilization of two or more separate roller sections journalled for free rotation on a continuous shaft, together with the independently controlled counterbalancing diaphragms there is provided an exceptionally sensitive and improved method of applying pressure to the wind-up roll through variable loading of the rider roll sections. Variations and the means of loading the rider roll can conceivably be any one or combination of the following:

(a) Unequal web thickness across the width of the web, which causes unequal increase in diameter over the width of the roll, can to some extent be compensated for by varying the pressure to any section of the rider roll.

(b) The freely rotating sections of the rider-roll adjust their rotational speed during this compensating action while being caused to maintain the designed contact pressure controlling the density of the wind-up roll throughout the cycle.

(c) The ability to control the contact pressure applied through each section of the rider roll enables the operator to increase or decrease the density of any part of the wind-up roll at will and thereby avoid wide variation in roll density and internal tension which may eventually cause the new rolls to split open.

(d) The flexibility of this multiple position variable loading of the rider roll is particularly important even though the web thickness is fairly even across its width, since an even pressure for each increment of width can be applied; an advantage not possible with conventional designs as explained earlier.

(e) Since, during the wind-up cycle, the new roll is constantly increasing in size and weight, means are provided to compensate for the widely varying contact pressure between the two drums and the outer surface of the web being wound.

(f) During the critical initial stages of the wind-up cycle, facilities for exerting the correct amount of pressure across the entire width of the new roll and the means to correct any tendency for soft spots to occur are combined with the means to concurrently vary the applied pressure to compensate for the changing angle of contact between the drums and the gradually increasing weight.

(g) Towards the end of cycle, the increasing weight of the wind-up roll contributes to the required pressure of contact with the drums, and this necessitates the gradual and concurrent relieving of the applied downward pressure of the rider roll.

(h) At this stage of the cycle it is frequently necessary to remove all of the pressure applied by the rider roll and yet have the rider roll maintain contact with the upper surface of the wind-up roll.

(i) Still other conditions occur with certain grades of web material when it is desirable that the pressure applied by the rider roll is relieved towards the extreme ends of the wind-up roll while light contact pressure is maintained towards the center or other similar variations thereof.

To this end are incorporated in the design means to effectively and automatically counterbalance the static weight of the rider roll assembly.

Pressure loaded diaphragms are attached to the pivoted levers and to the beam but are situated at the opposite side of the pivots to those diaphragms which are used for downward loading of the rider roll. It will be seen, therefore, that adjustment of pressure to the counterbalance diaphragms will result in a force being applied to each pivoted lever which will tend to cause an upward movement of the rider roll then, in this manner, just counterbalance its static weight.

The apparatus which has been described in detail substantially eliminates friction loads created by conventionally designed rider rolls carriage mechanisms and substitutes therefor free-cushioned loading devices functioning to remove objectional transference of vibrations during operation of the winding drums of the machine proper. The wind-up roll remains unaffected by any forces other than those applied under full control of an operator at a remote console. Rider roll deflections inherent in other designs are substantially simplified in the present apparatus and a considerable degree of versatility and flexibility of control is permitted during the loading of the wind-up roll. The innovations outlined together with the elimination of vibration and the inherent rigidity of the large diameter main winder drums ensure that web material of widely different consistency, caliper thickness and surface smoothness can be wound into high quality new rolls of even density throughout, to meet the most stringent demands of industry.

*Brief review of operation*

The web W will travel from a backstand, move through the slitter assembly 28, over the rolls 36, 34 and beneath the roll 38 between the winding drums 52 and 54. The terminal end of the web will be suitably mounted on the roll core 50 which is disposed between the nip of the drums 52 and 54. The hinged guideways 98 will be moved to the position shown in FIG. 5, the stops 106 having previously been adjusted to insure that no excessive axial pressure occurs at the terminal ends of the roll core.

The rider roll assembly 14 will be lowered by operating the motor 202, and the counterbalancing diaphragms will be preadjusted to offset the static weight of the rider roll and adjust the nip pressure applied by the rider roll 226.

The block 138 will engage the switch at block 148 to permit the drum 54 to be rotated, and the switch 272 will be opened due to engagement with the bumper 268 to prevent operation of the motor 202 and raising of the carriage assembly. The winder drum 54 will be accelerated to full speed and subsequently when the roll R builds up to a predetermined diameter, the bumper 270 will engage the switch 274 to cause the carriage assembly 14 to rise. The pressure to be applied by the rider roll will be incrementally controlled across the length of the rider roll particularly compensating for localized soft spots, etc. After a predetermined diameter has been reached at the roll R, the block 138 will engage control switch which causes the apparatus to cease operating.

It will be obvious to those skilled in the art that various changes may be made without departing from the spirit of the invention and therefore the invention is not limited to what is shown in the drawings and described in the specification but only as indicated in the appended claims.

We claim:

1. A winding apparatus for forming a convoluted roll from a continuous web comprising a support frame member, winding drum means extending transversely of said frame member and forming a core-receiving nip portion therebetween, displaceable core-way means extending vertically above and at opposite ends of said core-receiving nip portion, and a rider-roll carriage assembly mounted for vertcial movement on said frame member and including a depending rider-roll disposed above and substantially parallel to said core-receiving nip portion, said displaceable core-way means comprising vertically extending core-way members including opposed, vertically extending groove portions, said way members being pivotally supported on a vertical axis, and power means for pivoting said core-way members toward and away from opposite ends of said core-receiving nip portion.

2. The structure of claim 1 including a roll-core received in said core-receiving nip portion in frictional engagement with said winding drum means, said roll-core including terminal end portions disposed adjacent said core-way member groove portions and retained against axial movement thereby.

3. The structure of claim 2 in which said roll-core includes a single terminal ball bearing element tangentially engaging said core-way member groove portions.

4. In a web winding apparatus including a support frame member, a pair of winding drums forming an upwardly opening core-receiving nip portion, and a pair of core-way guide members flanking opposite sides of said core-receiving nip portion and extending vertically therefrom, said core-receiving guide way means including vertically extending groove portions disposed in a relatively fixed position with respect to opposite ends of said core-receiving nip portion and including a relatively wide guide portion for receiving the terminal ends of a roll core, said core-way guide members being pivotally supported on the vertical axis, and power means for pivoting said core-way members toward and away from opposite ends of said core-receiving nip portion.

References Cited by the Examiner

UNITED STATES PATENTS

| | | | |
|---|---|---|---|
| 867,153 | 9/24 | Rhondes | 242—66 |
| 1,831,201 | 11/31 | Sieg | 242—66 |
| 1,868,285 | 7/32 | Francis | 242—66 |
| 2,141,629 | 12/38 | Warner et al. | 242—66 |
| 2,165,111 | 7/39 | Rasmusson | 242—66 |
| 2,613,043 | 10/52 | Kmentt | 242—66 |
| 2,733,018 | 1/56 | Nitchie | 242—66 |
| 2,960,277 | 11/60 | Moser | 242—66 |

MERVIN STEIN, *Primary Examiner.*

STANLEY N. GILREATH, *Examiner.*